(12) United States Patent
Vasseur et al.

(10) Patent No.: US 11,777,854 B2
(45) Date of Patent: *Oct. 3, 2023

(54) GLOBALLY AVOIDING SIMULTANEOUS REROUTES IN A NETWORK

(71) Applicant: Cisco Technology, Inc., San Jose, CA (US)

(72) Inventors: Jean-Philippe Vasseur, Saint Martin d'Uriage (FR); Grégory Mermoud, Venthône (CH); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/829,435

(22) Filed: Jun. 1, 2022

(65) Prior Publication Data

US 2022/0294738 A1  Sep. 15, 2022

Related U.S. Application Data

(63) Continuation of application No. 17/153,633, filed on Jan. 20, 2021, now Pat. No. 11,368,401.

(51) Int. Cl.
*H04L 1/00* (2006.01)
*H04L 47/127* (2022.01)
(Continued)

(52) U.S. Cl.
CPC ........ *H04L 47/127* (2013.01); *H04L 47/2475* (2013.01); *H04L 47/28* (2013.01)

(58) Field of Classification Search
CPC .... H04L 47/127; H04L 47/2475; H04L 47/28
See application file for complete search history.

(56) References Cited

U.S. PATENT DOCUMENTS

| 7,269,157 B2 | 9/2007 | Klinker et al. |
| 7,558,276 B2 * | 7/2009 | Vasseur ................... H04L 45/04 370/248 |

(Continued)

FOREIGN PATENT DOCUMENTS

CN  109831386 A1  5/2019

OTHER PUBLICATIONS

Truong, et al., "Selective Review of Offline Change Point Detection Methods", online: https://arxiv.org/pdf/1801.00718.pdf, Mar. 2020, 58 pages, arXiv.org.

*Primary Examiner* — Abdelnabi O Musa
(74) *Attorney, Agent, or Firm* — BEHMKE INNOVATION GROUP LLC; James M. Behmke; Jonathon P. Western

(57) ABSTRACT

In one embodiment, a device obtains, from a plurality of routers in a network, a set of routing policies that collectively specify a first set of paths in the network, a second set of paths in the network, and time periods during which traffic is to be rerouted from one of the first set of paths to one of the second set of paths in the network. The device identifies overlapping path segments of the second set of paths in the network. The device makes, based in part on the overlapping path segments, a prediction that two or more of the set of routing policies will cause congestion along paths with overlapping path segments. The device adjusts, based on the prediction, the set of routing policies, to avoid causing the congestion.

20 Claims, 10 Drawing Sheets

(51) Int. Cl.
*H04L 47/2475* (2022.01)
*H04L 47/28* (2022.01)

(56) References Cited

U.S. PATENT DOCUMENTS

| | | | | |
|---|---|---|---|---|
| 8,797,886 | B1* | 8/2014 | Kompella | H04L 45/70 |
| | | | | 370/242 |
| 9,338,065 | B2 | 5/2016 | Vasseur et al. | |
| 9,667,559 | B2 | 5/2017 | Bhattacharya | |
| 11,171,885 | B2* | 11/2021 | Cidon | H04L 41/046 |
| 2006/0098657 | A1* | 5/2006 | Vasseur | H04L 45/04 |
| | | | | 370/392 |
| 2006/0250964 | A1* | 11/2006 | Vasseur | H04L 45/52 |
| | | | | 370/238 |
| 2011/0013520 | A1* | 1/2011 | Dunn | H04L 43/103 |
| | | | | 370/242 |
| 2014/0376373 | A1* | 12/2014 | Deshpande | H04L 47/12 |
| | | | | 370/235 |
| 2015/0051823 | A1* | 2/2015 | Joglekar | G08G 1/0145 |
| | | | | 701/118 |
| 2016/0021010 | A1* | 1/2016 | Vasseur | H04L 45/04 |
| | | | | 370/235 |
| 2016/0219065 | A1* | 7/2016 | Dasgupta | H04L 63/1441 |
| 2020/0067809 | A1* | 2/2020 | K | H04L 43/0811 |
| 2020/0162371 | A1 | 5/2020 | Musku et al. | |
| 2021/0067468 | A1* | 3/2021 | Cidon | H04L 45/745 |

\* cited by examiner

GLOBALLY AVOIDING SIMULTANEOUS REROUTES IN A NETWORK

CROSS-REFERENCE TO RELATED APPLICATION

This application is a continuation of U.S. patent application Ser. No. 17/153,633, filed on Jan. 20, 2021, entitled GLOBALLY AVOIDING SIMULTANEOUS REROUTES IN A NETWORK, by Jean-Philippe Vasseur, et al., the entire contents of which are incorporated by reference herein.

TECHNICAL FIELD

The present disclosure relates generally to computer networks, and, more particularly, to globally avoiding simultaneous reroutes in a network.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

Failure detection in a network has traditionally been reactive, meaning that the failure must first be detected before rerouting the traffic along a secondary (backup) path. In general, failure detection leverages either explicit signaling from the lower network layers or using a keep-alive mechanism that sends probes at some interval T that must be acknowledged by a receiver (e.g., a tunnel tail-end router). Typically, SD-WAN implementations leverage the keep-alive mechanisms of Bidirectional Forwarding Detection (BFD), to detect tunnel failures and to initiate rerouting the traffic onto a backup (secondary) tunnel, if such a tunnel exits.

With the recent evolution of machine learning, predictive failure detection in an SD-WAN now becomes possible through the use of machine learning techniques. This provides for the opportunity to implement proactive routing whereby traffic in the network is rerouted before an SLA violation occurs. However, there is also no guarantee that proactively rerouting the traffic onto a new path will result in improved performance, particularly if the new path exhibits even worse QoS metrics than the original path.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
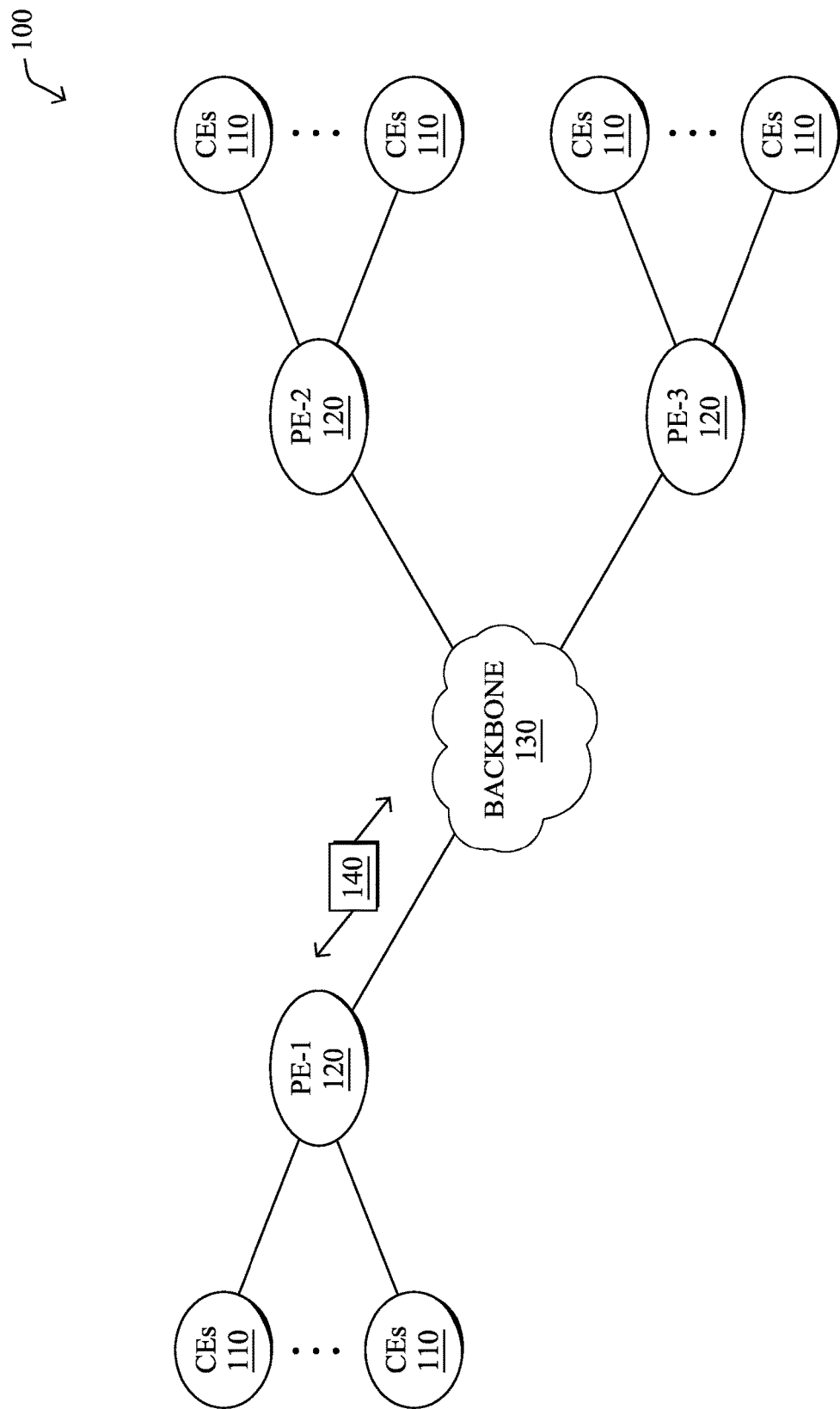
FIGS. 1A-1B illustrate an example communication network.

According to one or more embodiments of the disclosure, a device obtains, from a plurality of routers in a network, a set of routing policies that collectively specify a first set of paths in the network, a second set of paths in the network, and time periods during which traffic is to be rerouted from one of the first set of paths to one of the second set of paths in the network. The device identifies overlapping path segments of the second set of paths in the network. The device makes, based in part on the overlapping path segments, a prediction that two or more of the set of routing policies will cause congestion along paths with overlapping path segments. The device adjusts, based on the prediction, the set of routing policies, to avoid causing the congestion.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
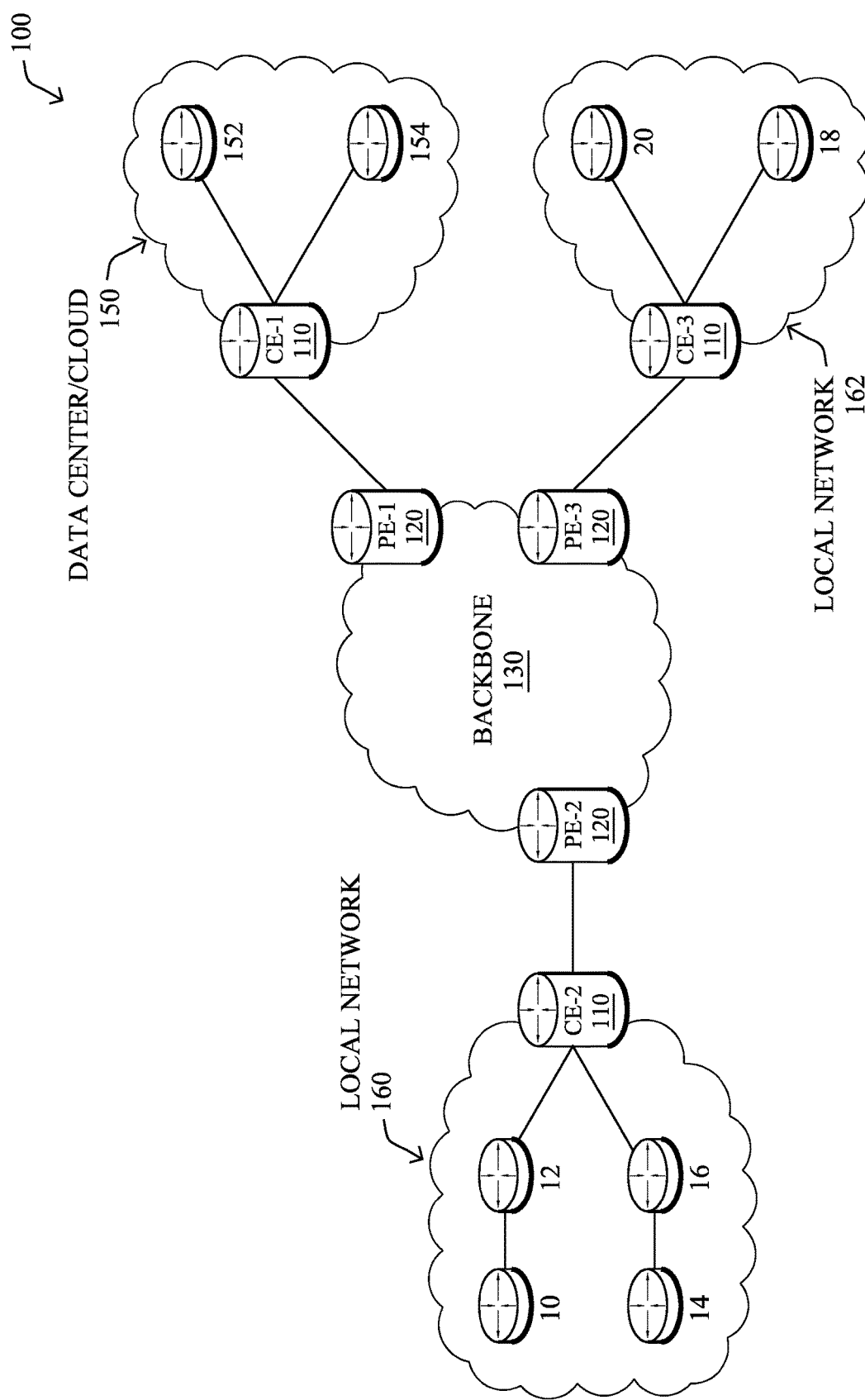

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
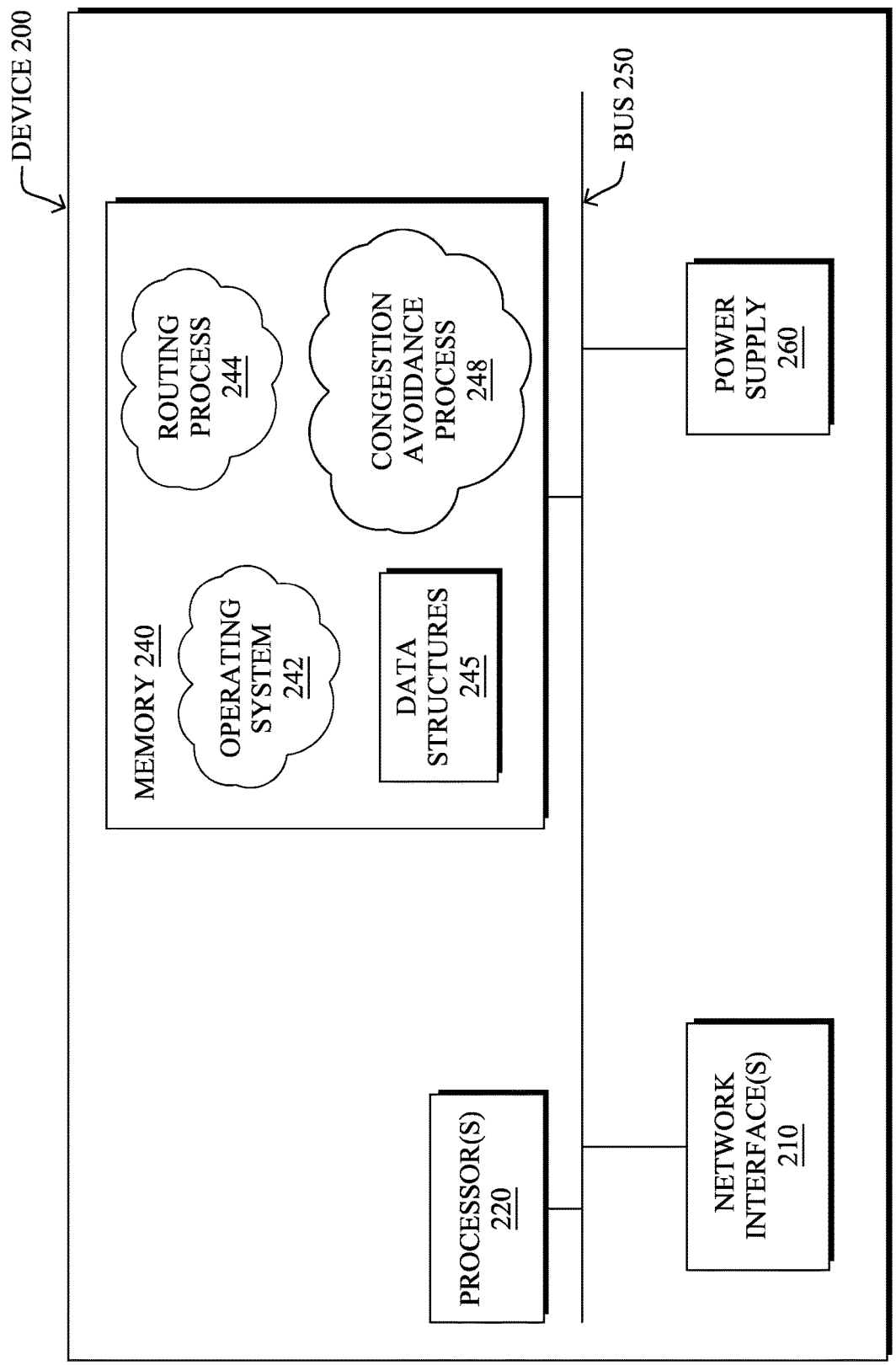
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a routing process 244 and/or a congestion avoidance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, routing process (services) 244 contains computer executable instructions executed by the processor 220 to perform functions provided by one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, routing process 244 and/or congestion avoidance process 248 may also include computer executable instructions that, when executed by processor(s) 220, cause device 200 to perform the techniques described herein. To do so, in some embodiments, routing process 244 and/or congestion avoidance process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, routing process 244 and/or congestion avoidance process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable QoS or an unacceptable QoS. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that routing process 244 and/or congestion avoidance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted that QoS of a particular network path will not satisfy the service level agreement (SLA) of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
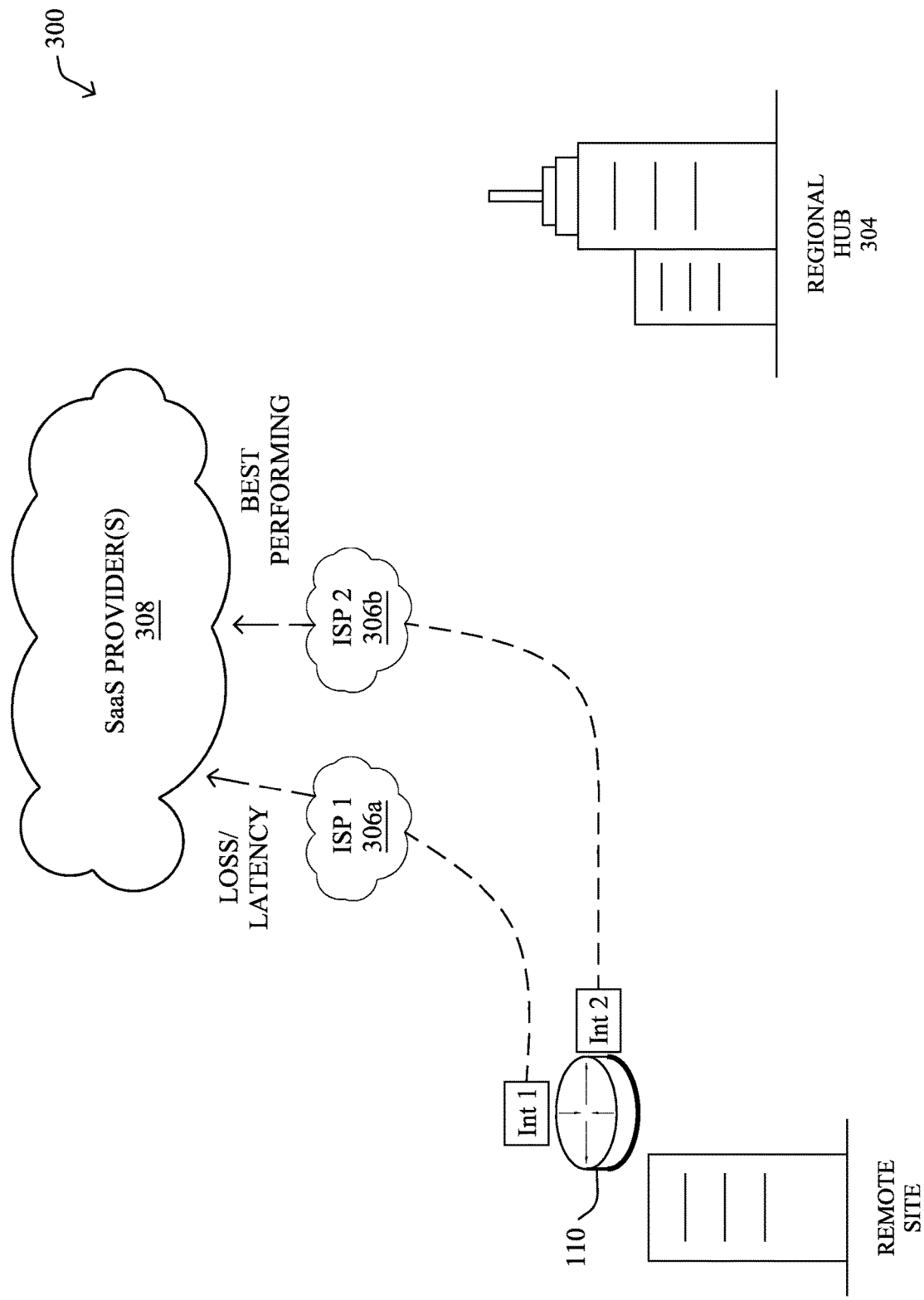
FIGS. 3A-3B illustrate example network deployments.
Figure 3B:
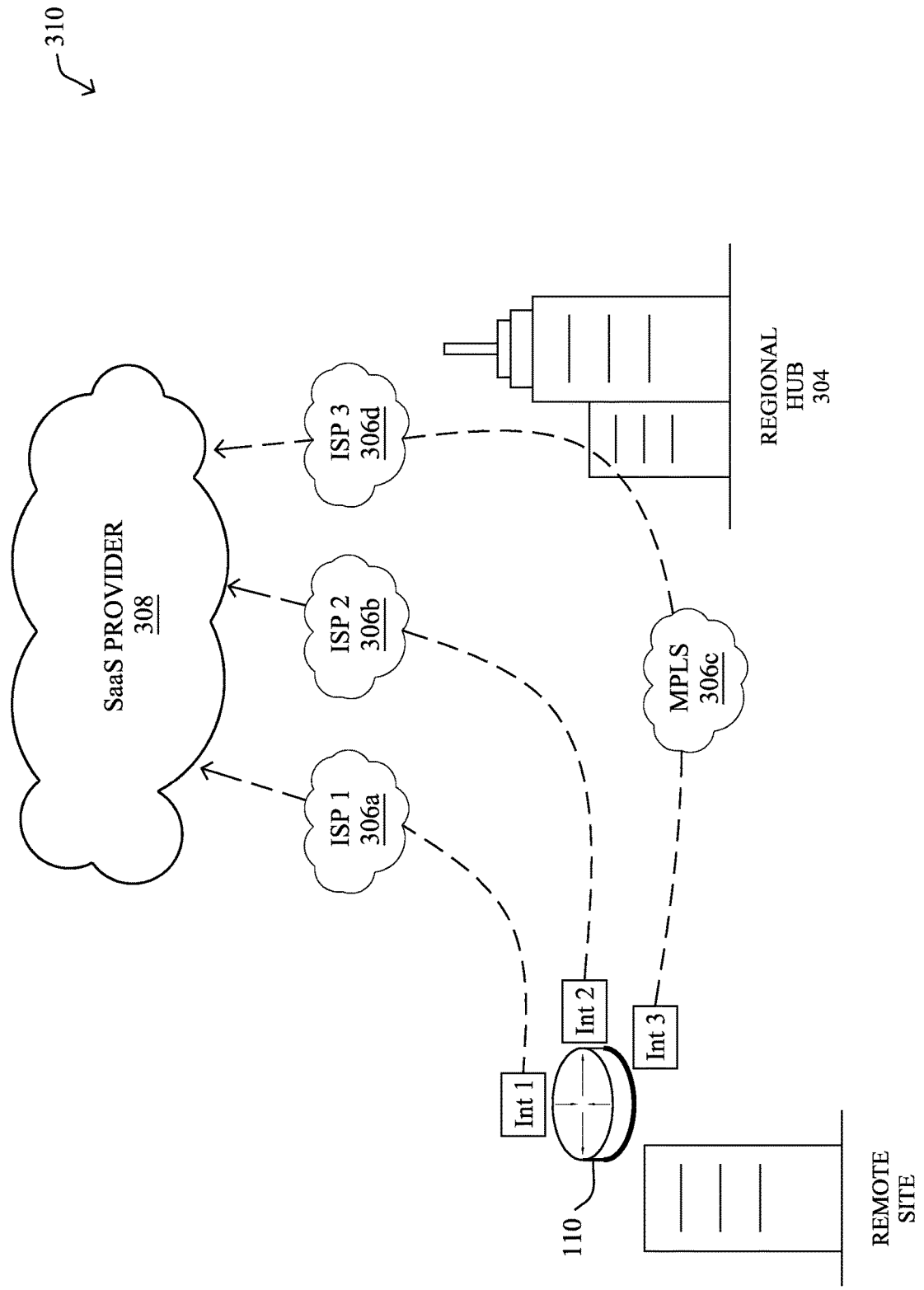

FIGS. 3A-3B illustrate example network deployments 300, 310, respectively. As shown, a router 110 (e.g., a device 200) located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
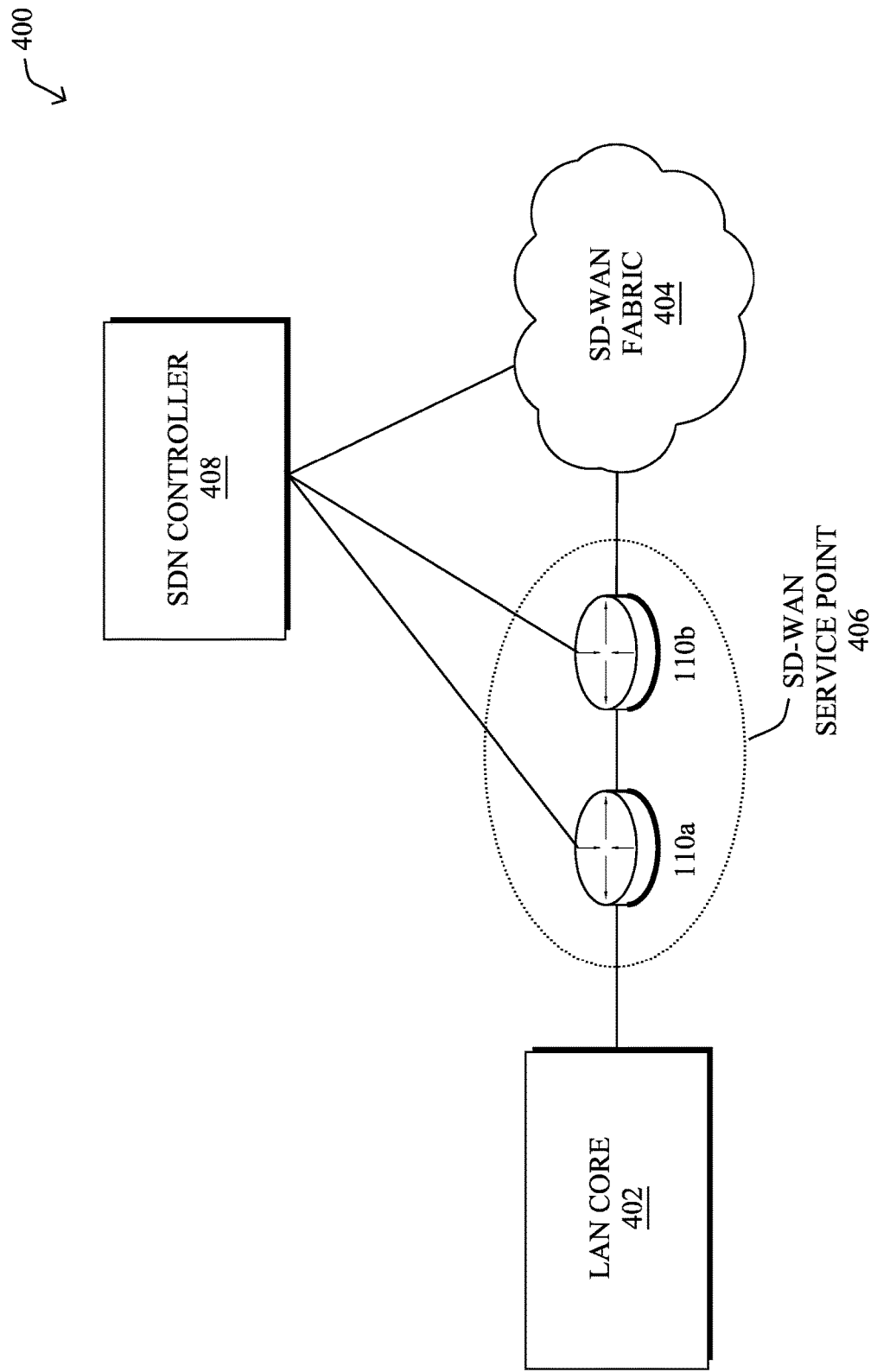
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance. SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., devices 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side. SD-WAN provides a high degree of flexibility allowing for efficient configuration management using SDN controllers with the ability to benefit from a plethora of transport access (e.g., MPLS, Internet with supporting multiple CoS. LTE, satellite links, etc.), multiple classes of service and policies to reach private and public networks via multi-cloud SaaS.

Application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPF, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path.' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (HTTP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
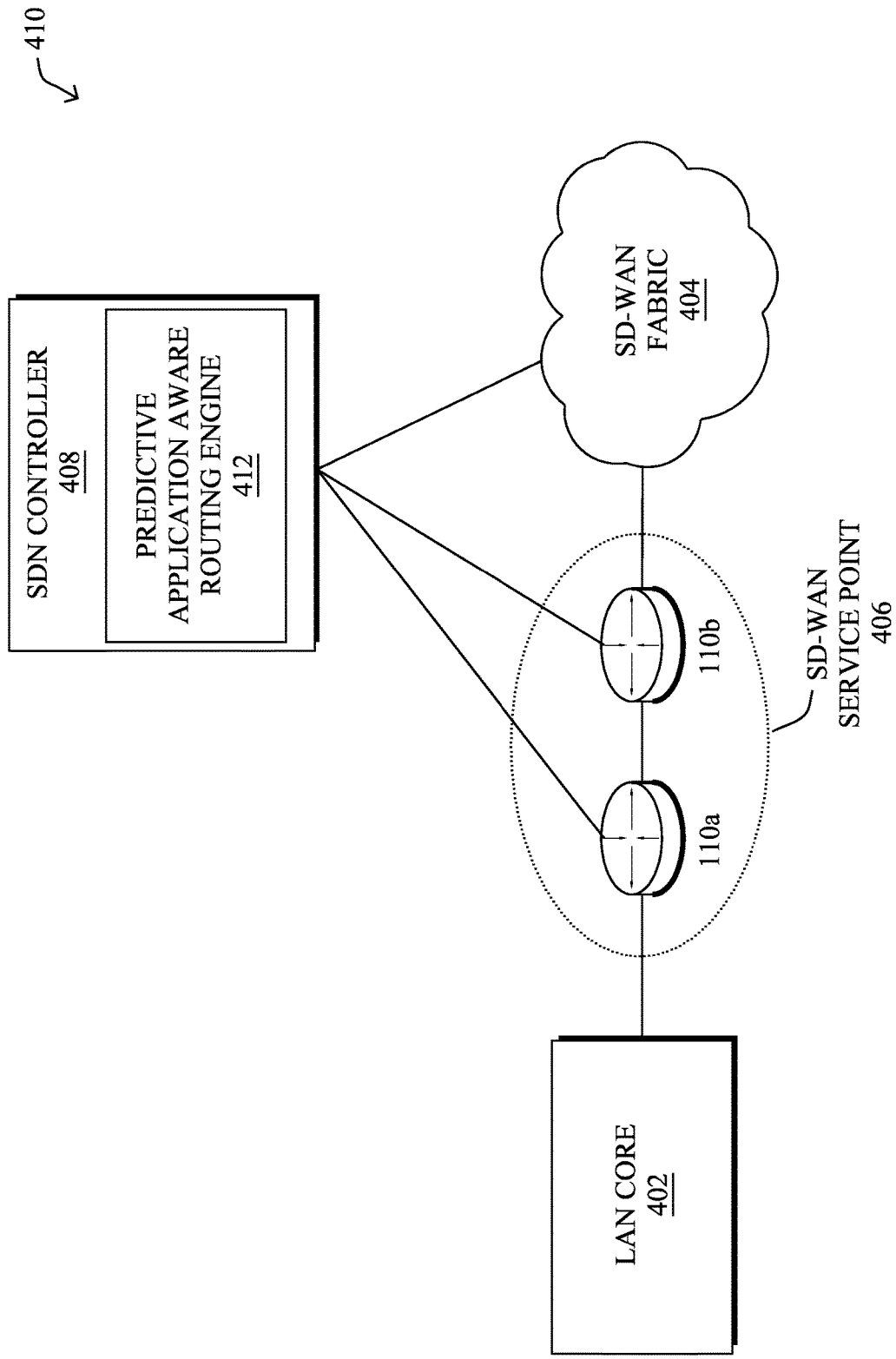

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of routing process 244 and/or congestion avoidance 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b. SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment.

Figure 5:
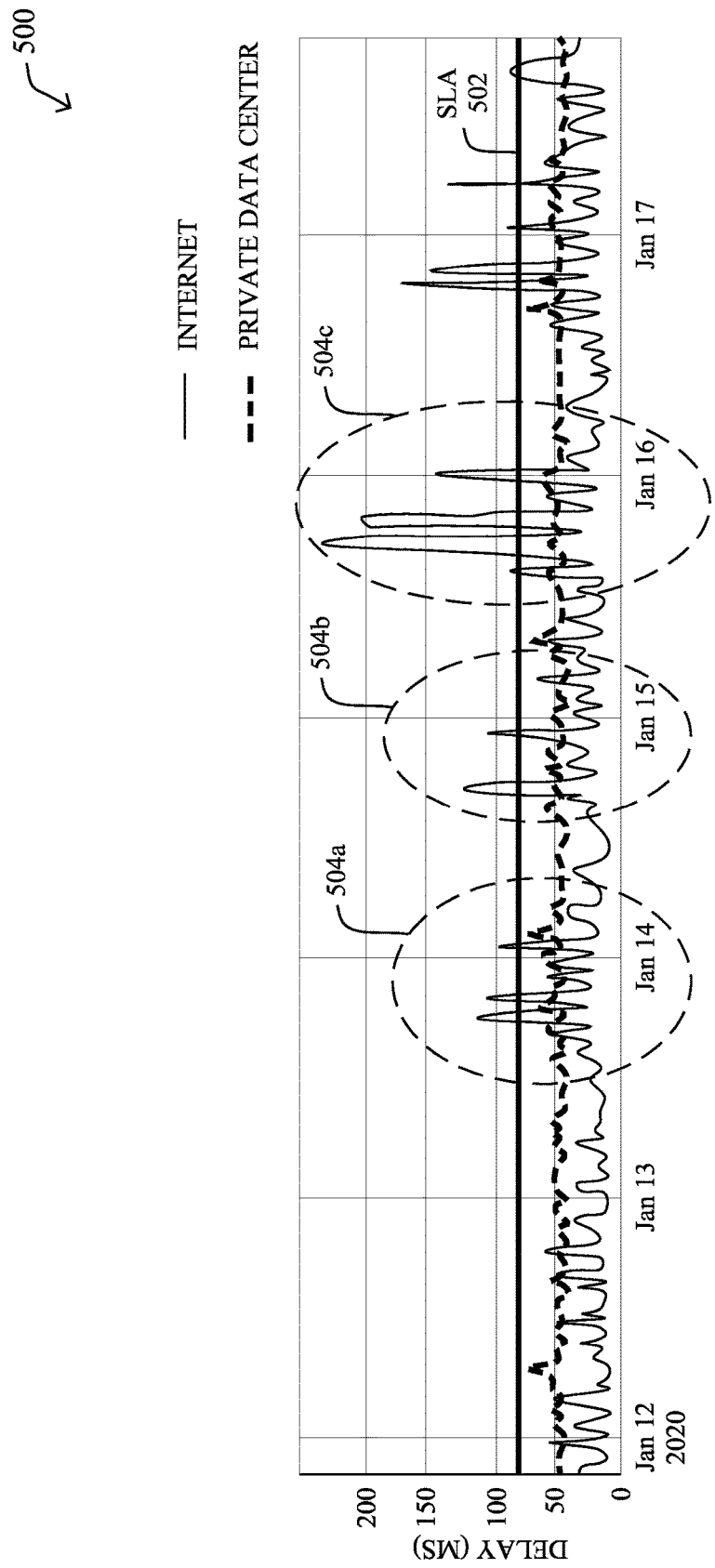
FIG. 5 illustrates an example plot of path delays over time.

By way of example, FIG. 5 illustrates a plot 500 of timeseries of delay observed by an edge device to reach a given destination via both the Internet (e.g., via a DIA connection) and a private data center (e.g., via traffic backhauling). Typically, the DIA connection provides the shortest delays to the destination. However, there are also times 504a-504c during which the backhauled connection via the private data center outperforms the DIA connection. Indeed, during times 504a-504c, the DIA connection exhibits spikes of delay, such that SLA 502 is violated.

As noted above, a predictive application aware routing engine, such as engine 412 in FIG. 4B, may identify trend changes in the network KPIs of a path by utilizing several probes that measure path health (e.g., loss, latency and jitter). In turn, the predictive routing engine utilizes statistical and/or machine learning techniques to predict such path deterioration in the future (e.g., predict SLA violations) and generate routing "patches" (e.g., policies) that proactively reroute application traffic before an SLA violation occurs.

One of the main challenges of predictive routing lies in the ability to accurately perform predictions of SLA violations. Generally speaking, the SLA violation predictions should be made with high recall, for the solution to be effective. However, recall is not the only consideration. Indeed, in some instances, it might also be acceptable not to predict an SLA violation and fall back to a reactive routing approach whereby SLAs are checked thanks to probing and the traffic is rerouted only when an actual SLA violation is detected.

As noted previously, a predictive application aware routing engine incorrectly predicting that a first path, P1, will violate an SLA and proactively triggering rerouting of the traffic onto a secondary path, P2, can be highly undesirable. Indeed, if P1 does not actually exhibit the predicted SLA violation, then the traffic was rerouted, needlessly. Rerouting is always a costly operation and should be avoided whenever possible. In addition, rerouting may disrupt some flows because of packet re-ordering, not to mention the unavoidable increase of jitter. Even worse, there is also the possibility that P2 does not meet the SLA for the traffic. As a result, the false positive of the predictive application aware routing engine will have actually caused the exact situation that it was trying to prevent. The worst possible situation is, of course, when SLAs are not violated on P1 and they are violated on P2.

Complicating the situation even further is the fact that there may be multiple forecasting engines that operate independent of one another (e.g., across multiple SDN controllers, routers, forecasting engines constructed on a per-path basis, etc.) to make rerouting decisions. Or, the rerouting decisions may be performed by a stateless agent in the network. In both situations, multiple routing changes may be applied in various areas of the network without a central coordination. Thus, it becomes possible to be in a situation where traffic is rerouted by a router R1 onto a path P2 and by a router R2 onto path P2' at overlapping times and paths P2 and P2' not being diverse (e.g., the paths may overlap). In such a case, the simultaneous routing changes could actually lead to potential congestion along those paths.

Even if the first forecasting engine makes use of counter-factual/what-if modeling to ensure that P2 provides safe SLAs during the forecasted failure of the original path, if both P2 and P2' are non-diverse, both rerouted traffic may sum up on the common path segment shared by P2 and P2', leading to potential congestion.

Globally Avoiding Simultaneous Reroutes in a Network

The techniques introduced herein allow a predictive application aware routing (PAAR) engine to avoid creating traffic congestion as part of its operation. In some aspects, the engine may retrieve a set of active routing patches in a network and determine the probability of potential congestion along path segment shared along their respective secondary paths, should both patches be active, simultaneously. Depending on this probability, the engine may then perform some arbitrage between "colliding" patches, to avoid situations in which two patches being activated at the same time will lead to congestion in the network.

Illustratively, the techniques described herein may be performed by hardware, software, and/or firmware, such as in accordance with congestion avoidance process 248, which may include computer executable instructions executed by the processor 220 (or independent processor of interfaces 210) to perform functions relating to the techniques described herein (e.g., in conjunction with routing process 244).

Specifically, according to various embodiments, a device obtains, from a plurality of routers in a network, a set of routing patches that collectively specify a first set of paths in the network, a second set of paths in the network, and time periods during which traffic is to be rerouted from one of the first set of paths to one of the second set of paths in the network. The device identifies overlapping path segments of the second set of paths in the network. The device makes, based in part on the overlapping path segments, a prediction that two or more of the set of routing patches will cause congestion along paths with overlapping path segments. The device adjusts, based on the prediction, the set of routing patches, to avoid causing the congestion.

Figure 6:
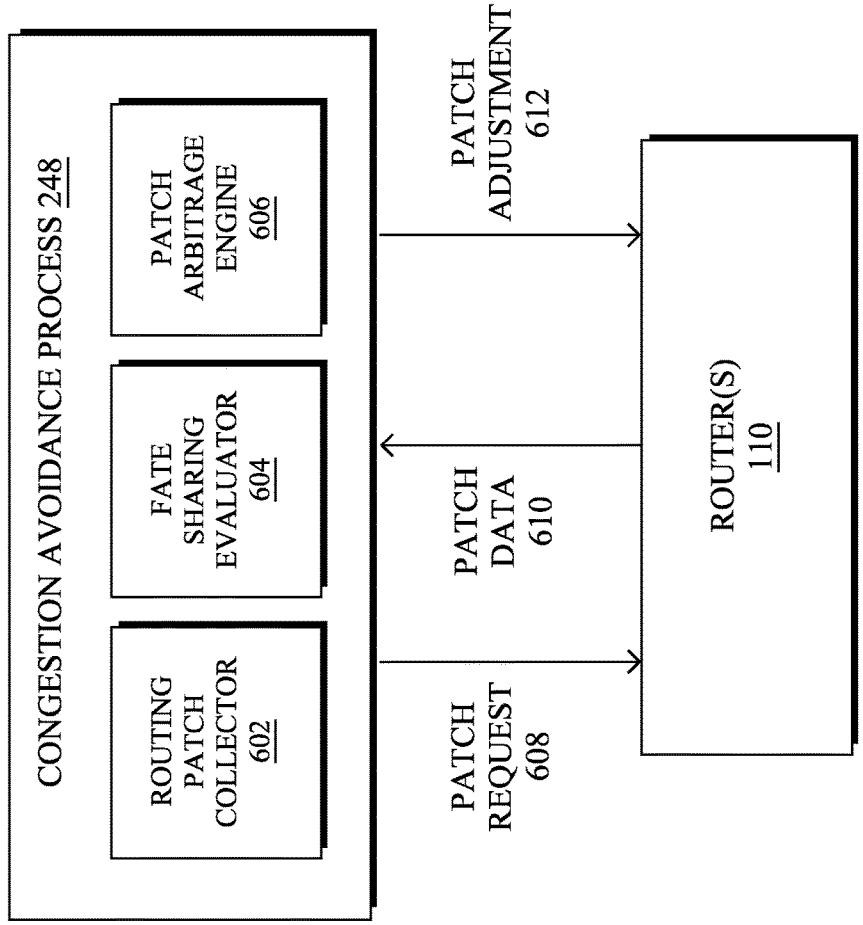
FIG. 6 illustrates an example architecture for globally avoiding simultaneous reroutes in a network.

Operationally, FIG. 6 illustrates an example architecture 600 architecture for globally avoiding simultaneous reroutes in a network, according to various embodiments. At the core of architecture 600 is congestion avoidance process 248, which may be executed by a supervisory device of a network or another device in communication therewith. For instance, congestion avoidance process 248 may be executed by an SDN controller (e.g., SDN controller 408 in FIG. 4), a particular networking device in the network (e.g., a router, etc.), or another device in communication therewith. As shown, congestion avoidance process 248 may include any or all of the following components: a routing patch collector 602, a fate sharing evaluator 604, and/or a path arbitrage engine 606. As would be appreciated, the functionalities of these components may be combined or omitted, as desired. In addition, these components may be implemented on a singular device or in a distributed manner, in which case the combination of executing devices can be viewed as their own singular device for purposes of executing congestion avoidance process 248.

In various embodiments, routing patch collector 602 may be configured to obtain the active routing patches used in the network. In general, a routing patch generally refers to the rules/characteristics used by a router to perform reroutes. For instance, a routing patch may be characterized by any or all of the following attributes:

A list of applications whose traffic will be rerouted. Typically, an application-recognition mechanism such as Network Based Application Recognition (NBAR) by Cisco Systems, Inc., or the like, can be used to identify the applications associated with the various traffic flows in the network. Here, the application identifiers for the routing patches may be the same as those used in such a mechanism, in some cases.

A source path p that is predicted to violate the SLA(s) of the application(s).

A target path p' that is expected not to violate the SLA(s) of the application(s).

A time interval $[t_1, t_2]$ during which the rerouting from path p to path p' shall be active.

In general, an "active" routing patch is one that specifies a proactive rerouting action, such as one specified by a forecasting engine, and implemented by a router in the network, such as a router 110. To retrieve the set of active routing patches from one or more routers 110, routing patch collector 602 may send a patch request 608 to routers 110, thereby requesting their active routing patches. In some embodiments, patch request 608 may be a multicast request that requests all active patches from a set of router 110. In response, routers 110 may return patch data 610 regarding their active routing patches to routing patch collector 602, indicating their collective set of planned rerouting actions. In addition, patch data 610 may also include estimates of the volumes of traffic associated with the routing patches, as well as the natures of the traffic (e.g., the applications associated with the traffic to be rerouted, the priorities of the traffic, etc.).

According to various embodiments, congestion avoidance process 248 may also include fate sharing evaluator 604 that is compute the topological fate sharing along a set of secondary paths $P'_1, \ldots, P'_n$ where n is the number of active patches obtained by routing patch collector 602. To do so, fate sharing evaluator 604 may compute the list of path segments shared by $P'_1, \ldots, P'_n$. Here, a path segment could be as granular as a link, in the case of internal topologies, or a tunnel traversing multiple Autonomous Systems (AS). In the first case, when paths are "internal." the routing Link State Database (LSDB) may be inspected, along with a reverse shortest path first (SPF) rooted at router R(s) that replied with a least one active patch to the previous request, so as to determine the set of segments (links) shared by all P' paths.

In turn, fate sharing evaluator 604 may use a probabilistic model to determine the probability of an SLA violation occurring for all rerouted traffic associated with the list of active routing patches at the time when those patches would be active, simultaneously. For instance, such a model may take as input traffic data regarding all active traffic along the paths, as well as the properties of the path segments (e.g., type of link, link speed, etc.).

In another embodiment, the model of fate sharing evaluator 604 may take into account the QoS along all shared links of the paths associated with the set of routing patches. Indeed, traffic benefiting from those patches may share the same queues or different queues, in which case it might be beneficial for the model to also take into account the queueing strategy on those shared links.

Various forms of models may be suitable to determine the probability of an SLA violation along a given path. For instance, the model of fate sharing evaluator 604 may take the form of a linear autoregressive model, such as an autoregressive integrated moving average (ARIMA) model, a more general regressor (e.g., Ridge, Lasso, etc.), a non-linear model (e.g., a neural network, a tree-based method, etc.), or the like. Regardless of the specific type of model used, the model of fate sharing evaluator 604 is may either predict the expected rate of violation in a given time interval (e.g., 1 hour), which is, in practice, proportional to the probability that a small subset of this interval has at least one violation. Or, the model may attempt to predict directly the probability that the interval includes at least one violation (e.g., in the case of a classifier using log-loss). In either case, fate sharing evaluator 604 can use the resulting predictions by the model to assess the probability of an SLA violation resulting from the set of active routing patches.

If fate sharing evaluator 604 determines that the probability of an SLA violation over the path segments associated with the set of routing patches exceeds a predefined threshold T, then it may signal patch arbitrage engine 606 to perform patch arbitrage according to a defined policy.

Note that it may be harder for fate sharing evaluator 604 to estimate the degree of fate sharing for a path, such as when a secondary path $P'_i$ is not as granular as a link, as in the case of a tunnel crossing a service provider network with no visibility of the underlay network. Accordingly, fate sharing evaluator 604 may use other techniques to model the probability of an SLA violation for such a higher-level path segment (e.g., as an AS). This could be performed even when a single PAAR engine is in charge of computing all routing patches for the network. Indeed, consider the case where a single PAAR engine (stateless or stateful) is in charge of computing multiple patches for a set of N pair of edge routers 110. In such a case, it becomes necessary for fate sharing evaluator 604 to determine the probability for each of the secondary path to be active at the same time. In the simplest case of a traditional overlay involving one service provider, it may be difficult to determine the degree of fate sharing for two tunnels sharing the same service provider network.

One approach to address the above may be for fate sharing evaluator 604 to compute its probabilities based on observations of past events. In particular, fate sharing evaluator 604 may build a correlation matrix C whose entries are the pairwise correlation coefficient between tunnels. If SLA violations on two tunnels are highly correlated, this might indicate a fate sharing scenario. Assuming that every entry of the correlation is matrix C is binarized, fate sharing evaluator 604 could apply a threshold $Corr_{min}$ and interpret correlation C as an incidence matrix of a graph G, to perform a clique analysis and determine groups of tunnels that have some fate sharing. In turn, fate sharing evaluator 604 may then analyze the common attribute across the clique and determine whether they all go through the same AS, use the same source ISP, etc. Fate sharing evaluator 604 may then take into account the degree of fate sharing across the paths, when computing the probability of an SLA failure, should both templates be active at the same time.

In the case of tunnels traversing multiple AS, fate sharing evaluator 604 may take a similar approach after performing a Border Gateway Protocol (BGP), to determine the list of AS traversed by each tunnel. In one implementation, fate sharing evaluator 604 may construct a path-graph with each AS or edge-router represented as a node, and each segment of the path (e.g., AS to AS) represented as an edge of the graph. A path in this graph, then, is a hyper-edge (e.g., an edge that passes from a source edge router, through multiple AS, and finally to the tail edge router). Fate sharing evaluator 604 can then identify the set of paths that have common edges from the graph. In addition, fate sharing evaluator 604 may also use the above-mentioned correlation matrix C, to check whether there is fate-sharing in such a subset of links with a common segment.

In various embodiments, congestion avoidance process 248 may also include path arbitrage engine 606, which is configured to perform arbitrage among the routing patches that could lead to an SLA violation if all of their traffic reroutes are active, simultaneously, as determined by fate sharing evaluator 604. In some embodiments, path arbitrage engine 606 may order the routing patches using a rank that reflects their respective impacts. For instance, path arbitrage engine 606 may order the routing patches according to their total number of minutes saved, taking into account the number of users, number of sessions, planned duration of the patch $[t_1, t_2]$, etc. Based on the ranked list, path arbitrage engine 606 may then opt to cancel some of the routing patches. In turn, path arbitrage engine 606 may send a patch adjustment message 612 to the affected router(s) 110 to cancel a particular routing patch. The affected router 110 may then relay is this information to the forecasting engine that scheduled the patch. Other approaches may be for path arbitrage engine 606 to give precedence to routing patches used to proactively reroute traffic of higher priority, should the full set of routing patches apply to traffic of various natures or applications.

In yet another embodiment, path arbitrage engine 606 may opt to apply time-sharing to the routing patches, so as to apply fairness. For instance, if two routing patches being active at the same time is likely to lead to congestion on a given shared link, path arbitrage engine 606 may enact an arbitrage that consist in sharing the time so as to avoid having both patches to be active at the same. In such a case, path arbitrage engine 606 may attempt to make this time division 'fair' by granting an equal split of the overlapping time to each of the routing patches or allocating active times to the routing patches that are proportional to the number of users impacted by the proactive rerouting. Similar to the above, path arbitrage engine 606 may implement any time sharing by sending a patch adjustment message 612 to the affected routers 110, so as to adjust their routing patches, accordingly.

Figure 7:
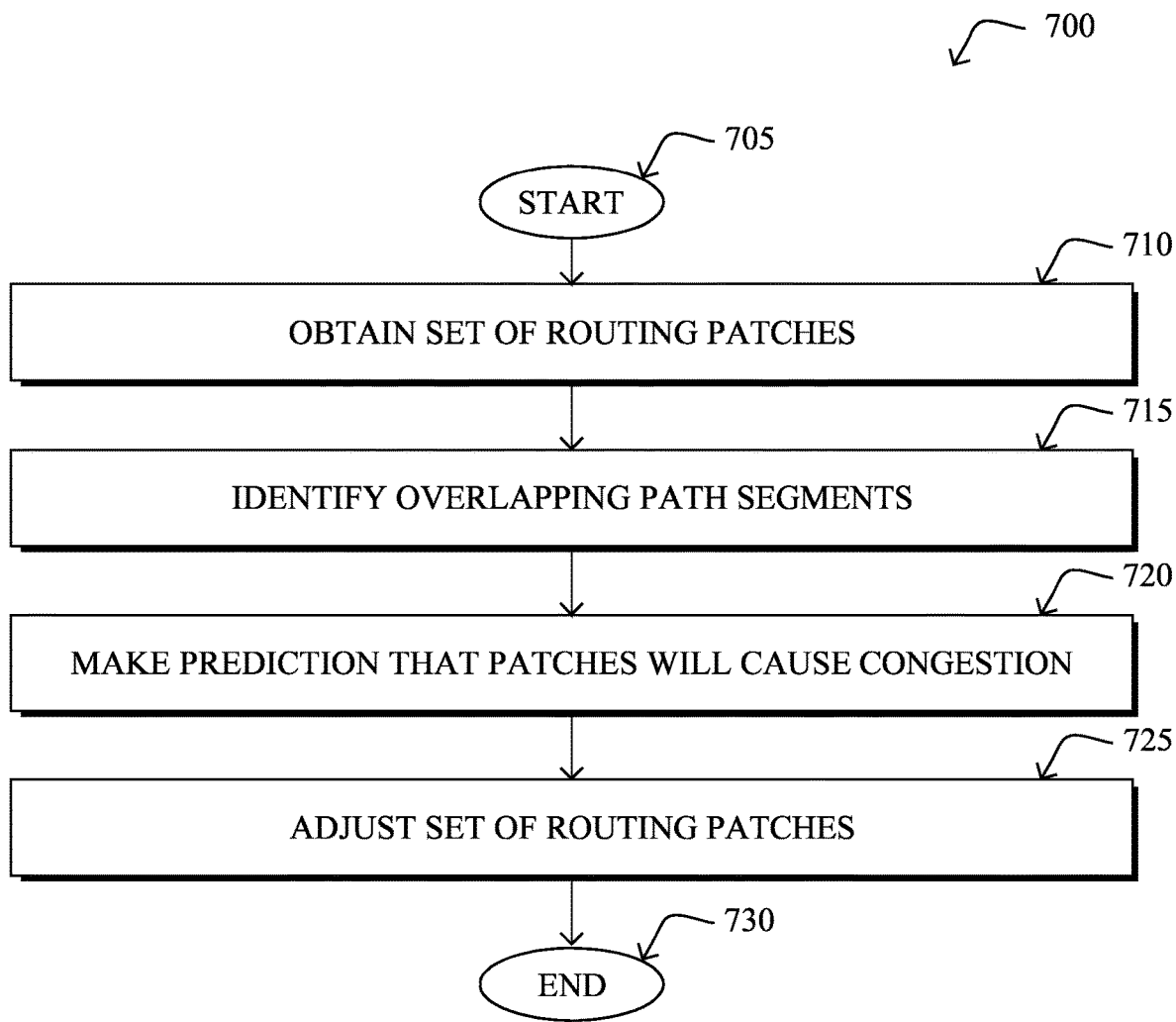
FIG. 7 illustrates an example simplified procedure for avoiding congestion due to simultaneous reroutes in a network.

FIG. 7 illustrates an example simplified procedure for avoiding congestion due to simultaneous reroutes in a network, in accordance with one or more embodiments described herein. For example, a non-generic, specifically configured device (e.g., device 200), such as a networking device (e.g., a router, an SDN controller for an SD-WAN, etc.), or a device in communication therewith, may perform procedure 700 by executing stored instructions (e.g., counterfactual evaluation process 248 and/or routing process 244). The procedure 700 may start at step 705, and continues to step 710, where, as described in greater detail above, the device may obtain a set of routing patches The techniques described herein, therefore, dramatically improve the performance of Predictive Application Aware Routing (PAAR) engines by combining a traffic forecaster and a counterfactual forecast that is capable of estimating the likelihood of a violation on a given path for various traffic conditions. Doing so allows a control engine to make much more robust and subtle routing decisions, including defensive reroutes, to protect critical traffic instead of merely rerouting the whole traffic of a link to alternate paths that may not be able to support that much traffic. In some embodiments, the set of routing patches may also specify application types associated with the traffic to be rerouted (e.g., voice traffic, etc.). For instance, the device may obtain the set of routing patches by requesting that each of the plurality of routers send their routing patches to the device for analysis, such as via a multicast request.

At step 715, as detailed above, the device may identify overlapping path segments of the second set of paths in the network. For instance, the device may identify the shared links, tunnels across multiple autonomous systems, or the like. In some embodiments, the device may also take into account the time periods during which the routing patches are active.

At step 720, the device may make, based in part on the overlapping path segments, a prediction that two or more of the set of routing patches will cause congestion along paths with overlapping path segments, as described in greater detail above. For instance, the device may predict the probability that the expected traffic that is rerouted onto those paths will lead to an SLA violation.

At step 725, as detailed above, the device may adjust the set of routing patches to avoid causing the congestion, based on the prediction. In one embodiment, the device may do so by deactivating at least one of the patches predicted to cause congestion. In another embodiment, the device may adjust a time period of such a routing patch, so that it is not active during the time period specified by another one of the routing patches predicted to cause congestion. In further embodiments, the device may select which routing patch(es) to adjust, by ranking the patches according to their expected traffic. For instance, the device may opt to adjust the routing patch(es) whose traffic has the lower priority than that of another patch. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments that provide for globally avoiding simultaneous reroutes in a network that could cause congestion, it is to be understood that various other adaptations and modifications may be made within the spirit and scope of the embodiments herein. For example, while certain embodiments are described herein with respect to using certain models for purposes of predicting SLA violations, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device and from a plurality of routers in a network, a set of routing policies that collectively specify a first set of paths in the network, a second set of paths in the network, and time periods during which traffic is to be rerouted from one of the first set of paths to one of the second set of paths in the network;
   identifying, by the device, overlapping path segments of the second set of paths in the network;
   making, by the device and based in part on the overlapping path segments, a prediction that two or more of the set of routing policies will cause congestion along paths with overlapping path segments; and
   adjusting, by the device and based on the prediction, the set of routing policies, to avoid causing the congestion.

2. The method as in claim 1, wherein at least one routing policy among the set of routing policies is configured to route traffic in the network according to a shortest path first (SPF)-based algorithm.

3. The method as in claim 1, wherein at least one routing policy among the set of routing policies is configured to route traffic in the network according to a constrained shortest path first (CSPF) algorithm.

4. The method as in claim 1, wherein adjusting the set of routing policies comprises:
   adjusting a time period specified by a first routing policy predicted to cause congestion such that it is not active during the time period specified by a second routing policy predicted to cause congestion.

5. The method as in claim 1, wherein one or more of the set of routing policies was installed to a particular router in the plurality of routers by a predictive application aware routing engine, in response to the predictive application aware routing engine predicting that one of the first set of paths via which that router routes traffic will violate a service level agreement associated with that traffic.

6. The method as in claim 5, wherein adjusting the set of routing policies comprises:
   adjusting a routing policy installed to the particular router, wherein the particular router notifies the predictive application aware routing engine that the routing policy was adjusted.

7. The method as in claim 1, wherein adjusting the set of routing policies comprises:
   deactivating at least one routing policy predicted to cause congestion.

8. The method as in claim 1, wherein at least one routing policy among the set of routing policies is configured to route traffic in the network according to a SPF algorithm in which a router in the network is restricted from overriding a routing decision made according to the SPF algorithm.

9. The method as in claim 1, wherein at least one routing policy among the set of routing policies is configured to route traffic in the network according to a SPF algorithm in which a router in the network is permitted to override a routing decision made according to the SPF algorithm.

10. The method as in claim 1, wherein one of the overlapping path segments comprises a tunnel traversing multiple autonomous systems.

11. An apparatus, comprising:
    one or more network interfaces;
    a processor coupled to the one or more network interfaces and configured to execute one or more processes; and a memory configured to store a process that is executable by the processor, the process when executed configured to:
   obtain, from a plurality of routers in a network, a set of routing policies that collectively specify a first set of paths in the network, a second set of paths in the network, and time periods during which traffic is to be rerouted from one of the first set of paths to one of the second set of paths in the network;
   identify overlapping path segments of the second set of paths in the network;
   make, based in part on the overlapping path segments, a prediction that two or more of the set of routing policies will cause congestion along paths with overlapping path segments; and
   adjust, based on the prediction, the set of routing policies, to avoid causing the congestion.

12. The apparatus as in claim 11, wherein at least one routing policy among the set of routing policies is configured to route traffic in the network according to a shortest path first (SPF)-based algorithm.

13. The apparatus as in claim 11, wherein at least one routing policy among the set of routing policies is configured to route traffic in the network according to a constrained shortest path first (CSPF) algorithm.

14. The apparatus as in claim 11, wherein the apparatus adjusts the set of routing policies by:
   adjusting a time period specified by a first routing policy predicted to cause congestion such that it is not active during the time period specified by a second routing policy predicted to cause congestion.

15. The apparatus as in claim 11, wherein one or more of the set of routing policy was installed to a particular router in the plurality of routers by a predictive application aware routing engine, in response to the predictive application aware routing engine predicting that one of the first set of paths via which that router routes traffic will violate a service level agreement associated with that traffic.

16. The apparatus as in claim 15, wherein the apparatus adjusts the set of routing policies by:
   adjusting a routing policy installed to the particular router, wherein the particular router notifies the predictive application aware routing engine that the routing policy was adjusted.

17. The apparatus as in claim 11, wherein the apparatus adjusts the set of routing policies by:
   ranking those routing policies predicted to cause congestion according to their expected traffic; and
   adjusting a particular routing policy based on its ranking.

18. The apparatus as in claim 11, wherein at least one routing policy among the set of routing policies is configured to route traffic in the network according to a SPF algorithm in which a router in the network is restricted from overriding a routing decision made according to the SPF algorithm.

19. The apparatus as in claim 11, wherein at least one routing policy among the set of routing policies is configured to route traffic in the network according to a SPF algorithm in which a router in the network is permitted to override a routing decision made according to the SPF algorithm.

20. A tangible, non-transitory, computer-readable medium storing program instructions that cause a device to execute a process comprising:
   obtaining, by a device and from a plurality of routers in a network, a set of routing policies that collectively specify a first set of paths in the network, a second set of paths in the network, and time periods during which traffic is to be rerouted from one of the first set of paths to one of the second set of paths in the network;
   identifying, by the device, overlapping path segments of the second set of paths in the network;
   making, by the device and based in part on the overlapping path segments, a prediction that two or more of the set of routing policies will cause congestion along paths with overlapping path segments; and
   adjusting, by the device and based on the prediction, the set of routing policies, to avoid causing the congestion.

* * * * *

UNITED STATES PATENT AND TRADEMARK OFFICE
CERTIFICATE OF CORRECTION

PATENT NO. : 11,777,854 B2
APPLICATION NO. : 17/829435
DATED : October 3, 2023
INVENTOR(S) : Jean-Philippe Vasseur et al.

It is certified that error appears in the above-identified patent and that said Letters Patent is hereby corrected as shown below:

In the Specification

Column 8, Line 22 please amend as shown:
core 402 and SD-WAN fabric 404. For instance, SD-WAN Column 8, Line 63 please amend as shown:
Internet with supporting multiple CoS, LTE, satellite links Column 12, Line 25 please amend as shown:
that requests all active patches from a set of routers 110. In Column 13, Line 5 please amend as shown:
used, the model of fate sharing evaluator 604 may either Signed and Sealed this
Fifth Day of December, 2023

Katherine Kelly Vidal
*Director of the United States Patent and Trademark Office*